United States Patent
Grechishkin et al.

(10) Patent No.: US 11,256,533 B1
(45) Date of Patent: *Feb. 22, 2022

(54) TRANSPARENT DISK CACHING FOR VIRTUAL MACHINES AND APPLICATIONS

(71) Applicant: Parallels International GmbH, Schaffhausen (CH)

(72) Inventors: Alexander Grechishkin, Moscow (RU); Konstantin Ozerkov, Moscow (RU); Alexey Koryakin, Moscow (RU); Nikolay Dobrovolskiy, Moscow (RU); Serguei Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,191

(22) Filed: Sep. 1, 2020

Related U.S. Application Data

(63) Continuation of application No. 15/348,351, filed on Nov. 10, 2016, now Pat. No. 10,795,708.

(51) Int. Cl.
  *G06F 9/455* (2018.01)
  *G06F 3/06* (2006.01)
(52) U.S. Cl.
  CPC .......... *G06F 9/45558* (2013.01); *G06F 3/065* (2013.01); *G06F 3/067* (2013.01);
  (Continued)
(58) Field of Classification Search
  CPC .... G06F 9/45558; G06F 3/0619; G06F 3/065; G06F 3/0667; G06F 3/067; G06F 3/0674; G06F 2009/45583
  See application file for complete search history.

(56) References Cited

U.S. PATENT DOCUMENTS

| 9,141,529 | B2 | 9/2015 | Klein et al. |
| 2005/0071549 | A1 | 3/2005 | Tross et al. |

(Continued)

OTHER PUBLICATIONS

Pfaff et al., Virtualization Aware File Systems: Getting Beyond the Limitations of Virtual Disks, 3rd Symposium Networked Systems Design and Implementation, May 2006.

(Continued)

*Primary Examiner* — Eric Cardwell
(74) *Attorney, Agent, or Firm* — Rosenberg, Klein & Lee

(57) ABSTRACT

A processing device in a host computer system receives an instruction to write data to a storage device coupled to the host computer system and store a copy of the data in a cache of the host computer system. The processing device initiates a write operation to write the data from the cache to the storage device and detects that the storage device is disconnected from the host computer system during execution of the write operation. In response to detecting that the storage device is disconnected, the processing device may suspend execution of at least one of a virtual machine or a process that issued the first instruction. After determining that the storage device is reconnected to the host computer system, the processing device can resumes the write operation to continue writing the data from the cache to the storage device. The processing device may further cache read data requested from the storage device so that the virtual machine can continue to access the read data from the cache in the event that the storage device is disconnected.

20 Claims, 8 Drawing Sheets

(52) U.S. Cl.
CPC .......... *G06F 3/0619* (2013.01); *G06F 3/0667* (2013.01); *G06F 3/0674* (2013.01); *G06F 2009/45583* (2013.01)

(56) References Cited

U.S. PATENT DOCUMENTS

2012/0072685 A1    3/2012   Otani
2014/0304434 A1    10/2014  Ayyagari et al.

OTHER PUBLICATIONS

Ben Pfaff, Tal Garfinkel, Mendel Rosenblum, "Virtualization Aware File Systems: Getting Beyond the Limitations of Virtual Disks", 3rd Symposium of Networked Systems Design and Implementation (NSDI), USENIX Association, May 2006, pp. 353-366.

TRANSPARENT DISK CACHING FOR VIRTUAL MACHINES AND APPLICATIONS

RELATED APPLICATIONS

This application is a continuation of U.S. patent application Ser. No. 15/348,351, filed Nov. 10, 2016, the entire contents of which are hereby incorporated by reference herein.

TECHNICAL FIELD

Embodiments of this disclosure relate generally to virtualized computer systems and, more specifically, relate to transparent disk caching for virtual machines and applications.

BACKGROUND

Virtualization may be viewed as an abstraction of physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Figure 1:
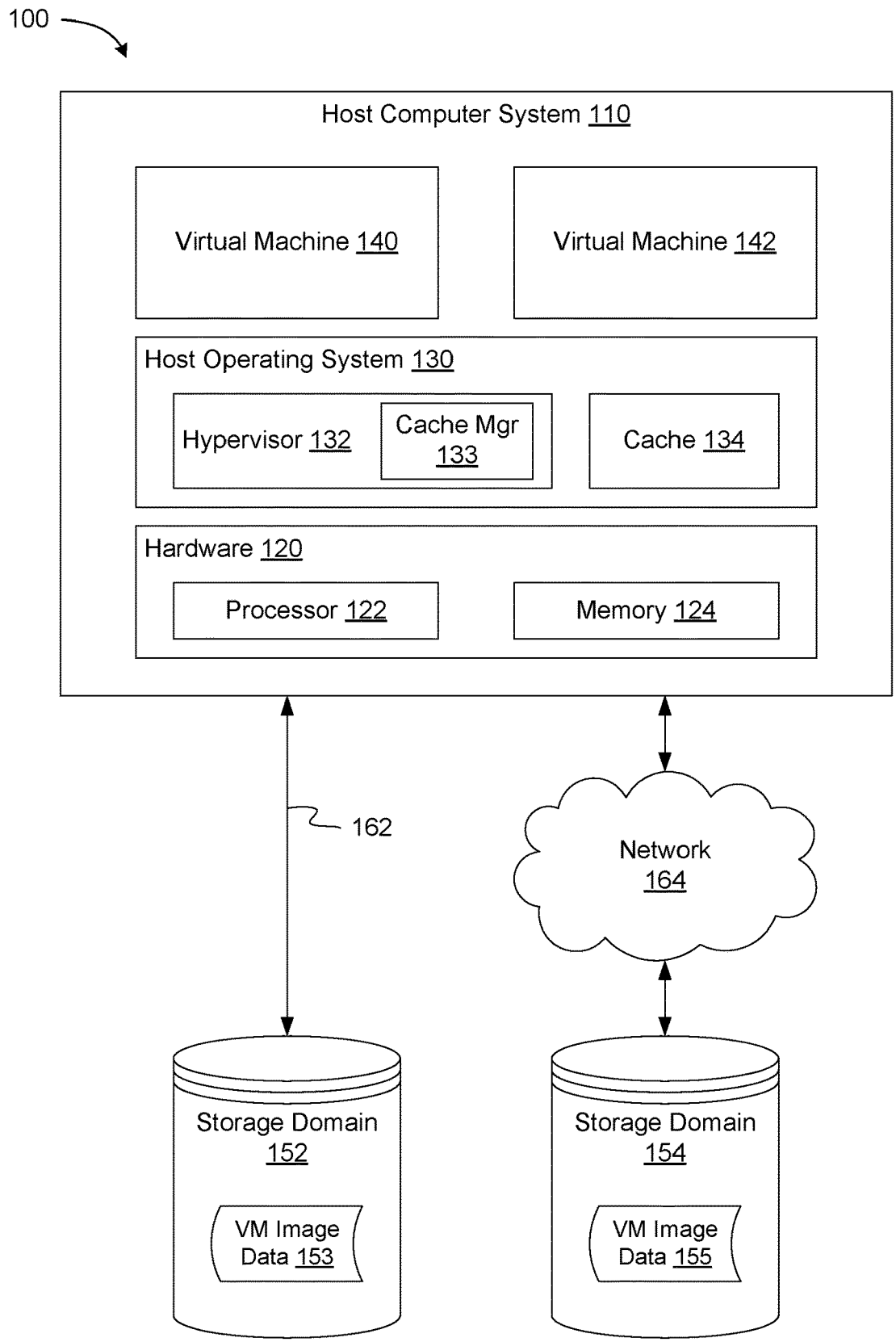
FIG. 1 is a block diagram illustrating a virtualized computing environment in which embodiments of the present disclosure may be implemented.

Embodiments are described for transparent disk caching for virtual machines and applications. In one embodiment, a hard disk drive (HDD), solid state drive (SSD) or a similar storage device is connected to a host computer system. This storage device or group of storage devices may be referred to herein generally as a "disk." The disk may be connected to the host computer system in a variety of different ways, including for example, a hardware interface, such as a universal serial bus (USB) interface, over a network, such as a storage area network (SAN) or the Internet, or through some other connection. The host computer system may include host applications (applications managed by the host operating system) and/or virtual machines (guest operating systems and guest applications) managed by a hypervisor that may part of the host operating system, run on top of the host operating system or run instead of the host operating system. Host applications or virtual machines of the host computer system may write data to the disk and read data from the disk during their normal course of operations. In one embodiment, the host operating system on the host computer system may control writes of host applications to the disk. In another embodiment, in which the host computer system includes virtual machines, the virtual machines do not have direct access to the disk, but rather the hypervisor provides disk virtualization. In this embodiment, a virtual disk, which is represented on a physical disk by a file, a linked set of files, or a similar structure, is presented to the virtual machine.

In the event that a physical disk becomes disconnected or otherwise unavailable while data is being written to the disk, such as if the disk becomes unplugged, the disk runs out of available storage space, or the network connection goes down, the data being written may be lost. Accordingly, in one embodiment, the host operating system or the hypervisor maintains a cache which buffers writes from host applications or virtual machines before the data is written to the disk. The host operating system or the hypervisor can manage the cache so that cache cleaning is delayed relative to the corresponding data transfer from the cache to the disk. Various data structures can be used to implement the cache, such as for example, a circular data buffer, ring buffer or other first-in, first-out structure. In one embodiment, upon receiving a write instruction, the host operating system or the hypervisor stores the received data in the cache, and subsequently writes the data to the disk. The data is only cleared from the buffer after a period of time, or when additional space is needed, thereby ensuring that the data is successfully committed to the disk before it is removed from the cache.

In the event of a failure in writing to the disk, or if the disk becomes disconnected or otherwise inaccessible, for example, the host computer system or the hypervisor can detect such an occurrence. When the disk is disconnected from the system, either immediately or after a delay period determined by the network protocol, the host operating system or the hypervisor may generate a failure signal. In one embodiment, the maximum delay period is determined by the size of the circular buffer so that there is always a guarantee of preservation of data which has not yet been recorded to the disk. In one embodiment, in response to the failure signal, the host operating system or the hypervisor suspends host applications or virtual machines running on the host operating system and prompts the user to recover the disk. During this time, the data stored in the cache is preserved, so that any uncompleted write operations can be completed once disk accessibility is restored.

After the restoration of the disk functionality, the host operating system or the hypervisor may use the data in the cache to assess the scale of the crash, append data from the cache to the disk to complete the write operations and attempt to resume the host applications or the virtual machines. After the host applications or the virtual machines are resumed, the host applications or the virtual machine may continue operations to utilize the data on disk.

Accordingly, aspects of the present disclosure prevent the permanent and irreparable loss of data not written to the disk at the time the disk was disabled, which would occur in a conventional system not utilizing the transparent disk caching techniques described herein. For example, when the disk contains a file system to store files created by a host application, without a disk cache, there may be no other way to restore the status of the file system at the moment of disk failure. Similarly, when a virtual machine is started from a disk and the disk is disconnected, the virtual machine will go down because the virtual machine data on the disk is lost and there may be no way to restore the functionality of the virtual machine without the disk cache. Additional details of the transparent disk caching process are described below.

FIG. 1 is a block diagram illustrating a virtualized computing environment 100 in which embodiments of the present disclosure may be implemented. In one embodiment, host computer system 110 may include one or more interconnected nodes. A "node" as used herein refers to a group of components 120 including one or more processors 122 and one or more associated memory devices 124 locally accessible by the processors in the group. In one embodiment, the memory devices 124 serve as a separate hardware cache. The physical processor 122 may be further communicatively coupled to other memory devices and/or input/output (I/O) devices of the host computer system 110.

A "physical processor," "processor" or "processing device herein refers to a device capable of executing instructions encoding arithmetic, logical, or I/O operations. In one embodiment, processor 122 may include an arithmetic logic unit (ALU), a control unit, and a plurality of registers. Furthermore processor 122 may be a single core processor which is typically capable of executing one instruction at a time (or process a single pipeline of instructions), or a multi-core processor which may simultaneously execute multiple instructions. In one embodiment, processor 122 may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between one or more processor pins and an external device capable of inputting and/or outputting binary data.

In one embodiment, host computer system 110 may run multiple virtual machines 140, 142 by executing a software layer, often referred to as a "hypervisor" 132 above the hardware 120 and below the virtual machines 140, 142, as schematically shown in FIG. 1. In one embodiment, the hypervisor 132 may be a component of a host operating system 130 executed by the host computer system 110. Alternatively, the hypervisor 132 may be provided by an application running under the host operating system 130, or may run directly on the host computer system 110 without an operating system beneath it. The hypervisor 132 may abstract the physical layer, including processors, memory, and I/O devices, and present this abstraction to virtual machines 140, 142 as virtual devices, including virtual processors, virtual memory, and virtual I/O devices. In one embodiment, the hypervisor 132 may include transparent disk caching manager 133 configured to control cache 134. In one embodiment, cache 134 buffers all writes from virtual machines 140 or 142 before data is written to one of underlying storage domains 152 or 154. Transparent disk caching manager 133 can manage the cache 134 so that cache cleaning is delayed relative to the corresponding data transfer from the cache 134 to the disk. Various data structures can be used to implement the cache 134, such as for example, a circular data buffer, ring buffer or other first-in, first-out structure. In one embodiment, upon receiving a write instruction, the transparent disk caching manager 133 stores the received data in the cache 134, and subsequently writes the data to one of storage domains 152 or 154. The data is only cleared from cache 134 after a period of time, or when additional space is needed, thereby ensuring that the data is successfully committed to the disk before it is removed from the cache 134.

Each of virtual machines 140, 142 may execute a guest operating system which may utilize the underlying virtual devices, each of which may map to a device of the host computer system 110 (e.g., a network interface device, a CD-ROM drive, etc.). One or more applications may be running on a virtual machine 140, 142 under the guest operating system.

Each of virtual machines 140, 142 may be associated with one or more virtual processors. Processor virtualization may be implemented by the hypervisor 132 scheduling time slots on physical processor 122 such that from the perspective of the guest operating system those time slots are scheduled on a virtual processor. Memory virtualization may be implemented by a page table (PT) which is a memory structure translating virtual memory addresses to physical memory addresses.

In one embodiment, host computer system 110 is coupled to one or more storage domains 152, 154. Each of the storage domains 152, 154 may store virtual machine image data 153, 155 for virtual machines 140, 142. In one embodiment, one or both of storage domains 152, 154 may employ file-based storage, in which case the disk images may be provided by respective files. In another embodiment, one or both of storage domains 152, 154 may employ block-based storage, in which case the disk images may be provided by respective logical volumes. In one embodiment, storage domain 152 is directly connected to host computer system 110 over a hardware interface 162, such as a universal serial bus (USB) interface. In one embodiment, storage domain 154 is connected to host computer system 110 over a network 164. The network 164 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Either or both of storage domains 152, 154 may be embodied on one or more mass storage devices which can include, for example, flash memory, solid state drives (SSDs), magnetic or optical disks, or tape drives; read-only memory (ROM); random-access memory (RAM); erasable programmable memory (e.g., EPROM and EEPROM); or any other type of storage medium.

Figure 2:
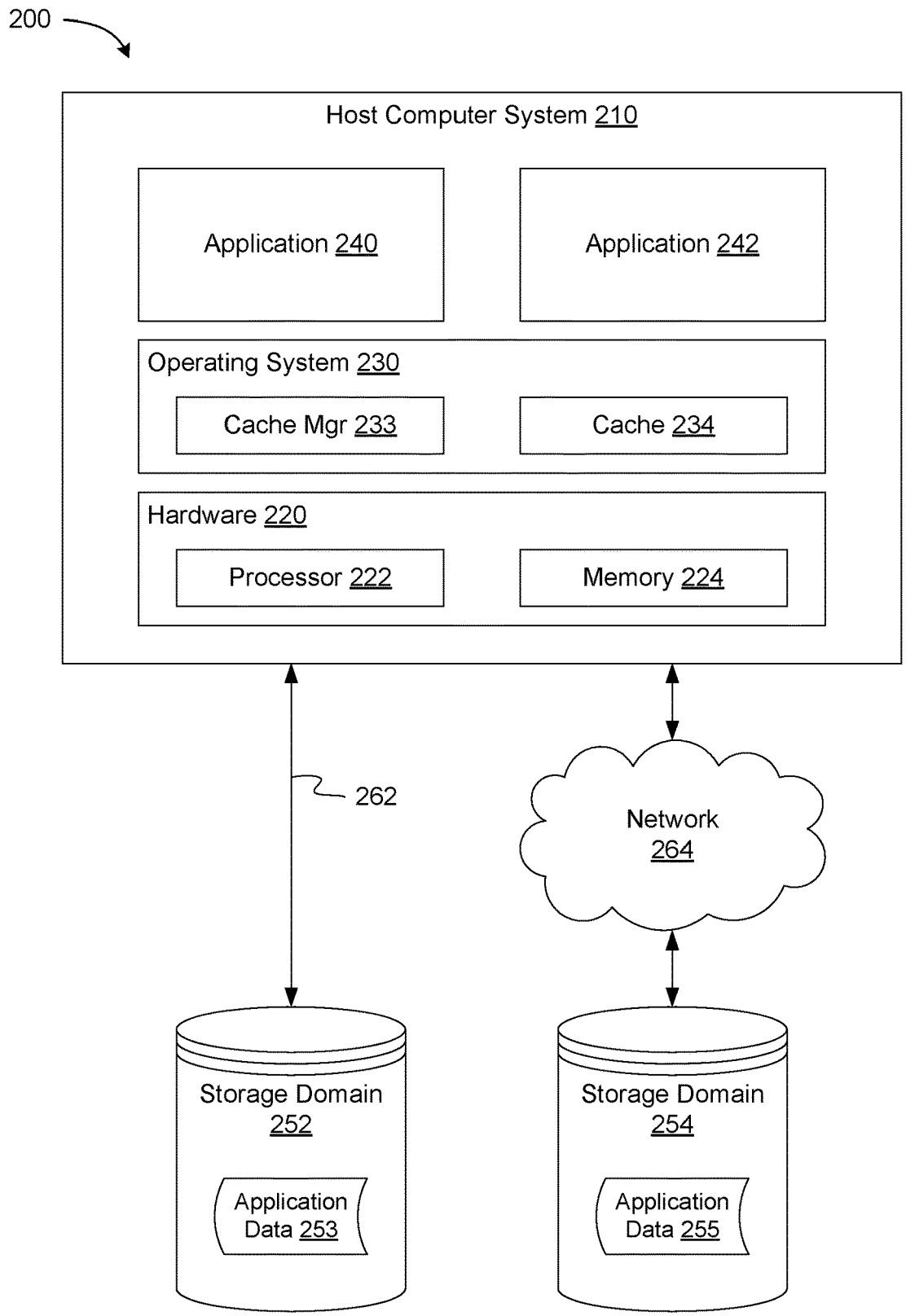
FIG. 2 is a block diagram illustrating a computing environment in which embodiments of the present disclosure may be implemented.

FIG. 2 is a block diagram illustrating a computing environment 200 in which embodiments of the present disclosure may be implemented. In one embodiment, host computer system 210 may include one or more interconnected nodes including hardware components 220 made up of one or more processors 222 and one or more associated memory devices 224 locally accessible by the processor 222. The physical processor 222 may be further communicatively coupled to other memory devices and/or input/output (I/O) devices of the host computer system 210.

In one embodiment, host computer system 210 may include an operating system (host operating system) 230 and may run one or more applications (host applications) 240, 242. Operating system 230 may include a set of programs that manage hardware components 220 of host computer system 210 and provide common services for applications, such as applications 240, 242 running on computer system 210. In one embodiment, operating system 230 may include a kernel to control low-level processes, such as how memory is read and written, the order in which processes are executed, how information is received and sent by host computer system 210, to control any peripheral devices, such as monitor, keyboard, mouse, touch screen, scanner, etc. and how to interpret information received over networks, such as network 264. Operating system 230 may additionally include a user interface to interact with a user of host computer system 210, allowing the user to control and use applications 240, 242, for example. In addition, operating system 230 may include application programming interfaces (APIs) to provide services and code libraries that let application developers write modular code reusing defined programming sequences in user space libraries or in the operating system 230 itself.

In one embodiment, the operating system 230 may include transparent disk caching manager 233 configured to control cache 234. In one embodiment, cache 234 buffers all writes from applications 240 or 242 before the data is written to one of storage domains 252 or 254. Transparent disk caching manager 233 can manage the cache 234 so that cache cleaning is delayed relative to the corresponding data transfer from the cache 234 to disk. Various data structures can be used to implement the cache 234, such as for example, a circular data buffer, ring buffer or other first-in, first-out structure. In one embodiment, upon receiving a write instruction, the transparent disk caching manager 233 stores the received data in the cache 234, and subsequently writes the data to one of storage domains 252 or 254. The data is only cleared from cache 234 after a period of time, or when additional space is needed, thereby ensuring that the data is successfully committed to the disk before it is removed from the cache 234.

In one embodiment, host computer system 210 is coupled to one or more storage domains 252, 254. Each of the storage domains 252, 254 may store corresponding application data 253 and 255 on behalf of applications 240 and 242. In one embodiment, one or both of storage domains 252, 254 may employ file-based storage, in which case the disk images may be provided by respective files. In another embodiment, one or both of storage domains 252, 254 may employ block-based storage, in which case the disk images may be provided by respective logical volumes. In one embodiment, storage domain 252 is directly connected to host computer system 210 over a hardware interface 262, such as a universal serial bus (USB) interface. In one embodiment, storage domain 254 is connected to host computer system 210 over a network 264. The network 264 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Either or both of storage domains 252, 254 may be embodied on one or more mass storage devices which can include, for example, flash memory, solid state drives (SSDs), magnetic or optical disks, or tape drives; read-only memory (ROM); random-access memory (RAM); erasable programmable memory (e.g., EPROM and EEPROM); or any other type of storage medium.

Figure 3:
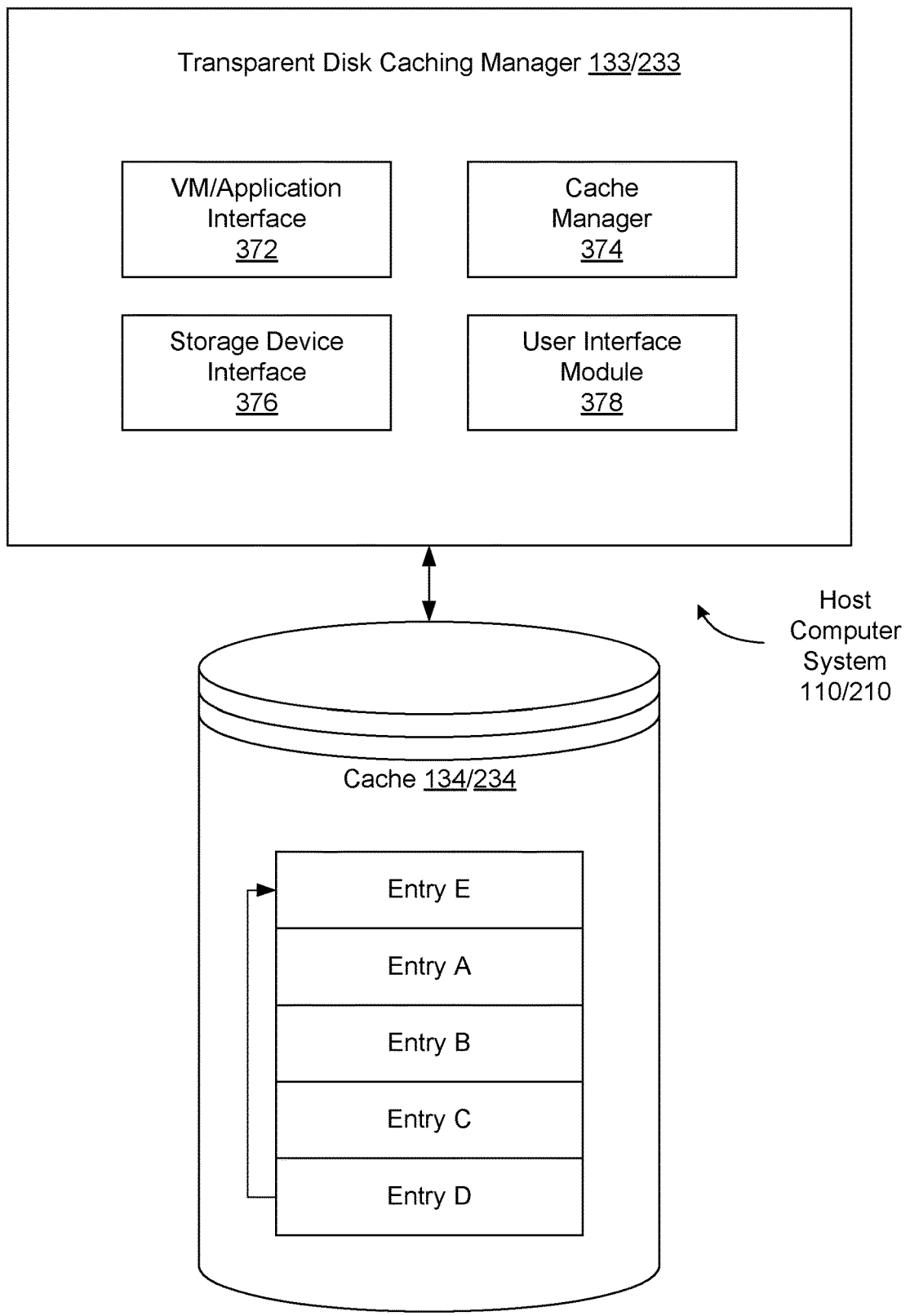
FIG. 3 is a block diagram illustrating transparent disk caching manager, according to an embodiment.

FIG. 3 is a block diagram illustrating transparent disk caching manager, according to an embodiment. In one embodiment, transparent disk caching manager 133, 233 includes virtual machine/application interface 372, cache manager 374, storage interface device 376, and user interface module 378. This arrangement of modules and components may be a logical separation, and in other embodiments, these modules or other components can be combined together or separated in further components. In one embodiment, disk cache 134, 234 is connected to transparent disk caching manager 133, 233 and includes a circular data buffer. In one embodiment, host computer system 110, 210 may include both transparent disk caching manager 133, 233 and cache 134, 234. In another embodiment, cache 134, 234 may be external to host computer system 110, 210 and may be connected to host computer system 110, 210 over a network or other connection. In other embodiments, transparent disk caching manager 133, 233 may include different and/or additional components which are not shown to simplify the description.

In one embodiment, virtual machine/application interface 372 is responsible for communication and interaction with either virtual machines 140, 142 or applications 240, 242 on host computer system 110, 210. For example, virtual machine/application interface 372 may receive an instruction to write data to a storage device (e.g., part of storage domains 152, 154, 252, 254) from one of virtual machines 140, 142 or applications 240, 242. The instruction may be received during the normal course of operation of virtual machines 140, 142 or applications 240, 242 and may relate to user data, system data, virtual machine image data, or other data being committed to the underlying physical storage devices in one of storage domains 152, 154, 252, 254. Virtual machine/application interface 372 may further interact with virtual machines 140, 142 or applications 240, 242 to, for example, suspend execution of virtual machines 140, 142 in response to detecting that the storage device is disconnected from host computer system 110, 210 and to resume execution of virtual machines 140, 142 in response to determining that the storage device is reconnected.

In one embodiment, cache manager 374 manages and controls disk cache 134, 234 on host computer system 110, 210. For example, in response to virtual machine/application interface 372 receiving the instruction to write data to a storage device, cache manager 374 may store a copy of the data in cache 134, 234. In one embodiment, cache manager 374 buffers all writes from virtual machines 140, 142 and applications 240, 242 in cache 134, 234 before data is written to one of underlying storage domains 152, 154, 252, 254. Cache manager 374 can manage the cache 134, 234 so that the data remains stored in cache 134, 234 until the data has been committed to disk. The data is only cleared from cache 134, 234 after a period of time, or when additional space is needed, thereby ensuring that the data is successfully committed to the disk before it is removed from the cache 134, 234. Various data structures can be used to implement the cache 134, 234 such as for example, a circular data buffer, ring buffer or other first-in, first-out structure. A circular buffer is useful because it does not need to have its elements shuffled around when one is consumed and is a good implementation strategy for a queue that has fixed maximum size. When circular buffer is full (e.g., written with entries A-E) and a subsequent write is performed, cache manager 374 can overwrite the oldest data (e.g., entry A) and continue in a circular fashion.

In one embodiment, after an interruption to a write operation, cache manager 374 can compare the data committed to the storage device to what is stored in cache 134, 234 to determine where in the data to resume the write operation. In one embodiment, during this comparison, cache manager 374 can disable the hardware cache in memory 124, 224, to ensure that the comparison of data in cache 134, 234 is made with the data committed to the storage device and not whatever data is stored in the hardware cache.

In one embodiment, storage device interface 376 is responsible for communication and interaction with the storage devices of storage domains 152, 154, 252, 254. For example, once cache manager 374 stores a copy of the data in cache 134, 234, storage device interface 376 may initiate a write operation to write the data from the cache 134, 234 to the storage device. In one embodiment, storage domains 152, 252 are directly connected to host computer system 110, 210 over a hardware interface 162, 262, such as a universal serial bus (USB) interface. In one embodiment, storage domains 154, 254 are connected to host computer system 110, 210 over a network 164, 264. During execution of the write operation, there may be a failure in writing the data to the storage device, such as if the USB interface 162, 262 becomes disconnected, the network 164, 264 goes down or if the storage device becomes otherwise inaccessible. Storage device interface 376 may detect that the storage device is disconnected from host computer system 110, 210 or is otherwise unavailable and may, for example, instruct virtual machine/application interface 372 to suspend execution of the virtual machine 140, 142 (if applicable). In one embodiment, storage device interface 376 may notify user interface module 378 of the disconnect, so that user interface module 378 can instruct the user to initiate a repair. Storage device interface 376 may further determine that the storage device is reconnected to host computer system 110, 210 and can resume the write operation to continue writing data from cache 134, 234 to the reconnected storage device.

In one embodiment, when the write operation is initiated, storage device interface 376 creates a file on the storage device, which is assigned a file handle, and begins writing data to disk. If the storage device is disconnected during the write operation the handle gets lost and when the storage device is reconnected, all of the files are assigned different handles. As a result, the virtual machine or application won't be able to find the right files into which it can continue writing data. In one embodiment, cache manager 374 maintains an indication of the file handles assigned at the start of the write operation in cache 134, 234. This mapping of handles to files can be used to identify the corresponding files after the storage device is reconnected by pointing the newly assigned handles to the original file handles assigned pre-failure. In one embodiment, the cache 134, 234 may use a "virtual handle" to which both the old and new handles can be matched.

In one embodiment, upon receiving notification from storage device interface 376 that the storage device has been disconnected, user interface module 378 may present a notification to the user on a display of the host computer system 110, 210. The notification may include the phrase "Disk disconnected, re-attach disk to continue writing file" or other similar language.

In one embodiment, additional instructions to write data to the storage devices may be received while the storage devices are disconnected from host computer system 110, 210. When this occurs, transparent disk caching manager 133, 233 may continue receiving the instructions may store the additional data in disk cache 134, 234. Transparent disk caching manager 133, 233 may, however, refrain from initiating any additional write operations to the storage devices while the storage devices are disconnected. Instead, the additional data may remain in disk cache 134, 234 until the storage devices are reconnected, at which point, transparent disk caching manager 133, 233 may initiate a new write operation to write the data from cache to disk.

Figure 4:
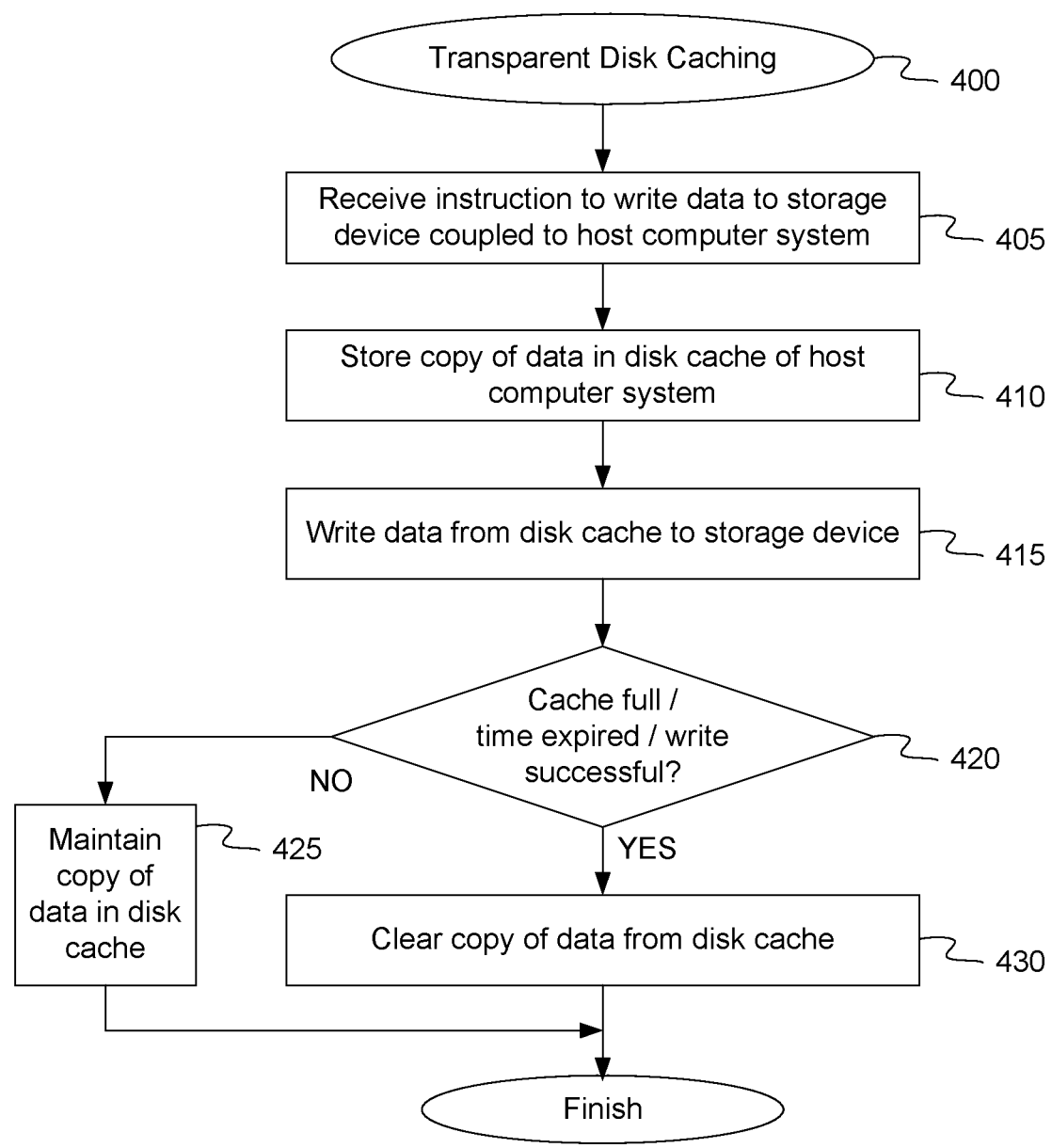
FIG. 4 is a flow diagram illustrating a transparent disk caching method for write requests, according to an embodiment.

FIG. 4 is a flow diagram illustrating a transparent disk caching method for write requests, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow a host computer system to cache data received from a virtual machine or application in a disk cache before the data is committed to disk, so that the data can be recovered in the event of an interruption during the write process. In one embodiment, method 400 may be performed by transparent disk caching manager 133, 233, as shown in FIGS. 1-3.

Referring to FIG. 4, at block 405, method 400 receives an instruction to write data to a storage device coupled to the host computer system 110, 210. In one embodiment, virtual machine/application interface 372 may receive an instruction to write data to a storage device (e.g., part of storage domains 152, 154, 252, 254) from one of virtual machines 140, 142 or applications 240, 242. The instruction may be received during the normal course of operation of virtual machines 140, 142 or applications 240, 242 and may relate to user data, system data, virtual machine image data, or other data being committed to the underlying physical storage devices in one of storage domains 152, 154, 252, 254.

At block 410, method 400 stores a copy of the data in a cache 134, 234 of the host computer system 110, 210. In one embodiment, cache manager 374 may store a copy of the data in cache 134, 234 before the data is written to one of underlying storage domains 152, 154, 252, 254. Cache manager 374 can manage the cache 134, 234 so that the data remains stored in cache 134, 234 until the data has been committed to disk. The data is only cleared from cache 134, 234 after a period of time, or when additional space is needed, thereby ensuring that the data is successfully committed to the disk before it is removed from the cache 134, 234.

At block 415, method 400 writes the data from cache 134, 234 to the storage device. In one embodiment, storage device interface 376 may initiate a write operation to write the data from the cache 134, 234 to the storage device, in response to receiving the instruction at block 405. In one embodiment, the data is only written to disk after it is stored in cache 134, 234 to ensure that the data is not lost in the event of an interruption during the write operation.

At block 420, method 400 determines if the write to disk was successful, if the cache 134, 234 is full or if a period of time has passed since the write operation was performed. In one embodiment, storage device interface 376 receives an acknowledgement message or other confirmation from the storage device to indicate that the data was successfully committed to disk. Upon receiving this acknowledgment, storage device interface 376 can determine that the data in cache 134, 234 is no longer needed. Since cache 134, 234 may be implemented as a circular buffer, in one embodiment when the buffer becomes full, storage device interface 376 may evict certain data or overwrite that data with new data. In one embodiment, it is the oldest data in the cache 134, 234 which is evicted, so it is likely that this data was successfully committed to the disk before it is removed from the cache. In another embodiment, storage device interface 376 uses a timer to measure the age of data in the cache, thereby ensuring that the data is maintained in the cache for at least a minimum period of time before it is evicted. If none of these conditions have been met, at block 425, method 400 maintains the copy of the data in cache 134, 234.

If at block 420 however, method 400 determines that at least one of the conditions has been met, at block 430, method 400 clears the copy of the data from cache 134, 234 to make space available to store data corresponding to subsequent write operations. In one embodiment, cache manager 374 implements a time delay after determining that the data was successfully written to disk and before clearing data from cache 134, 234. This period of time delay can be used to check data integrity. When data is written to the disk, there still is no guarantee that all of the data was written correctly, so cache manager 374 may re-read the data and compare it to cached data. This verification may occur during the time delay period.

Figure 5:
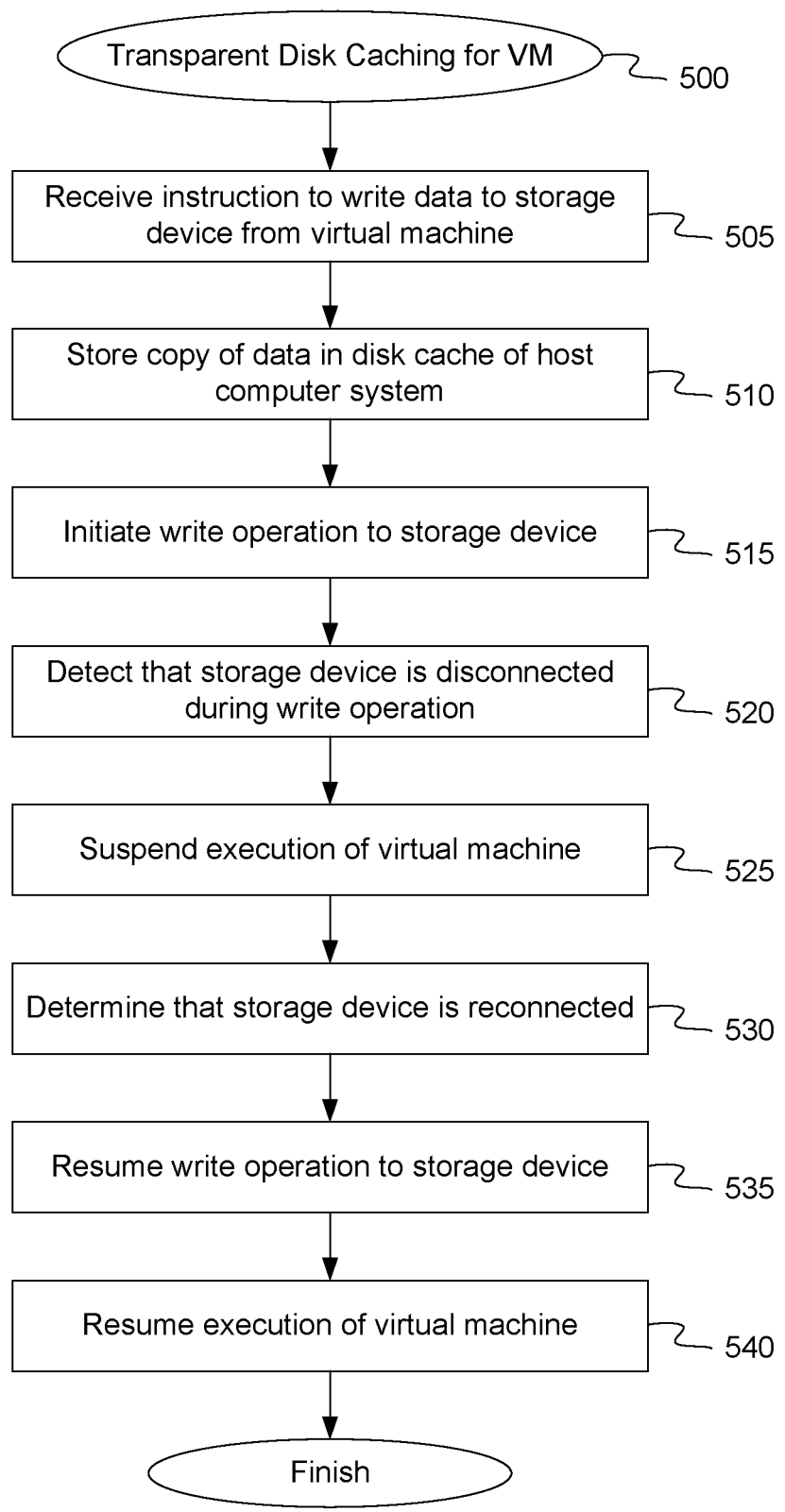
FIG. 5 is a flow diagram illustrating a transparent disk caching method for virtual machines, according to an embodiment.

FIG. 5 is a flow diagram illustrating a transparent disk caching method for virtual machines, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow a host computer system to cache data received from a virtual machine in a disk cache before the data is committed to disk, so that the data can be recovered in the event of an interruption during the write process. In one embodiment, method 500 may be performed by transparent disk caching manager 133 as shown in FIGS. 1 and 3.

Referring to FIG. 5, at block 505, method 500 receives an instruction to write data to a storage device coupled to the host computer system 110. In one embodiment, virtual machine/application interface 372 may receive an instruction to write data to a storage device (e.g., part of storage domains 152, 154) from one of virtual machines 140, 142. The instruction may be received during the normal course of operation of virtual machines 140, 142 and may relate to user data, system data, virtual machine image data, or other data being committed to the underlying physical storage devices in one of storage domains 152, 154.

At block 510, method 500 stores a copy of the data in a cache 134 of the host computer system 110. In one embodiment, cache manager 374 may store a copy of the data in cache 134 before the data is written to one of underlying storage domains 152, 154. Cache manager 374 can manage the cache 134 so that the data remains stored in cache 134 until the data has been committed to disk. The data is only cleared from cache 134 after a period of time, or when additional space is needed, thereby ensuring that the data is successfully committed to the disk before it is removed from the cache 134.

At block 515, method 500 writes the data from cache 134 to the storage device. In one embodiment, storage device interface 376 may initiate a write operation to write the data from the cache 134 to the storage device, in response to receiving the instruction at block 505. In one embodiment, the data is only written to disk after it is stored in cache 134 to ensure that the data is not lost in the event of an interruption during the write operation.

At block 520, method 500 detects that the storage device is disconnected from the host computer system 110 during execution of the write operation. In one embodiment, storage domain 152 is directly connected to host computer system 110 over a USB interface 162 and storage domain 154 is connected to host computer system 110 over a network 164. During execution of the write operation, there may be a failure in writing the data to the storage device, such as if the USB interface 162 becomes disconnected, the network 164 goes down or if the storage device becomes otherwise inaccessible. In one embodiment, storage device interface 376 may detect that the storage device is disconnected from host computer system 110 or is otherwise unavailable. For example, a USB driver on host computer system 110 may detect that the USB cable has been unplugged or that power has been lost to the USB connected storage device and may provide a notification of this event to storage device interface 376. In another embodiment, a network driver in host computer system 110 may monitor that status of a network connection and notify storage device interface 376 when the connection to network 164 (and therefore to storage domain 154) is lost.

At block 525, method 500 pauses the write operation and suspends execution of virtual machines 140, 142 in response to detecting that the storage device is disconnected at block 520. In another embodiment, method 500 may suspend execution of a process, running either on the virtual machine or on the host, which initiated the write operation. In one embodiment, virtual machine/application interface 372 may suspend execution of the virtual machine 140, 142. Suspending a virtual machine may be similar to putting a real computer into a sleep mode. In one embodiment, to suspend virtual machines 140, 142, virtual machine/application interface 372 may save a current state of the virtual machines 140, 142 (including the state of all applications and processes running in the virtual machine) to a special file in memory 124 of host computer system 110. When the suspended virtual machine is resumed, it may continue operating at the same point the virtual machine was at the time of its suspending. In another embodiment, virtual machine/application interface 372 may instead pause virtual machines 140, 142 by temporarily releasing the resources, such as memory and processor, currently used by these virtual machines. The released resources can then be used by the host computer system 110 and its applications or by other virtual machines running on the host computer system 110.

At block 530, method 500 determines that the storage device is reconnected to the host computer system 110. In one embodiment, storage device interface 376 may determine that the storage device is reconnected to host computer system 110. In one embodiment, the USB driver on host computer system 110 may detect that the USB cable has been plugged back in or that power has been restored to the USB connected storage device and may provide a notification of this event to storage device interface 376. In another embodiment, the network driver in host computer system 110 may monitor that status of the connection to network 164 and notify storage device interface 376 when the connection is restored.

At block 535, method 500 resumes the write operation to continue writing the data from cache 134 to the storage device. In one embodiment, cache manager 374 maintains an indication of the last piece of data that was successfully written to disk before the storage device was disconnected. In this case, cache manager 374 can resume writing with the next piece of data in sequence. In another embodiment, after an interruption to a write operation, cache manager 374 can compare the data committed to the storage device to what is stored in cache 134 to determine what data from cache 134 is still to be written to the storage device.

At block 540, method 500 resumes execution of virtual machines 140, 142 in response to determining that the storage device is reconnected at block 530. In one embodiment, virtual machine/application interface 372 may read the state information of the virtual machines 140, 142 from the special file in memory 124 of host computer system 110 and restore the state to that indicated in the file, so that the virtual machines 140, 142 may continue operating at the same point as at the time they were suspended.

Figure 6:
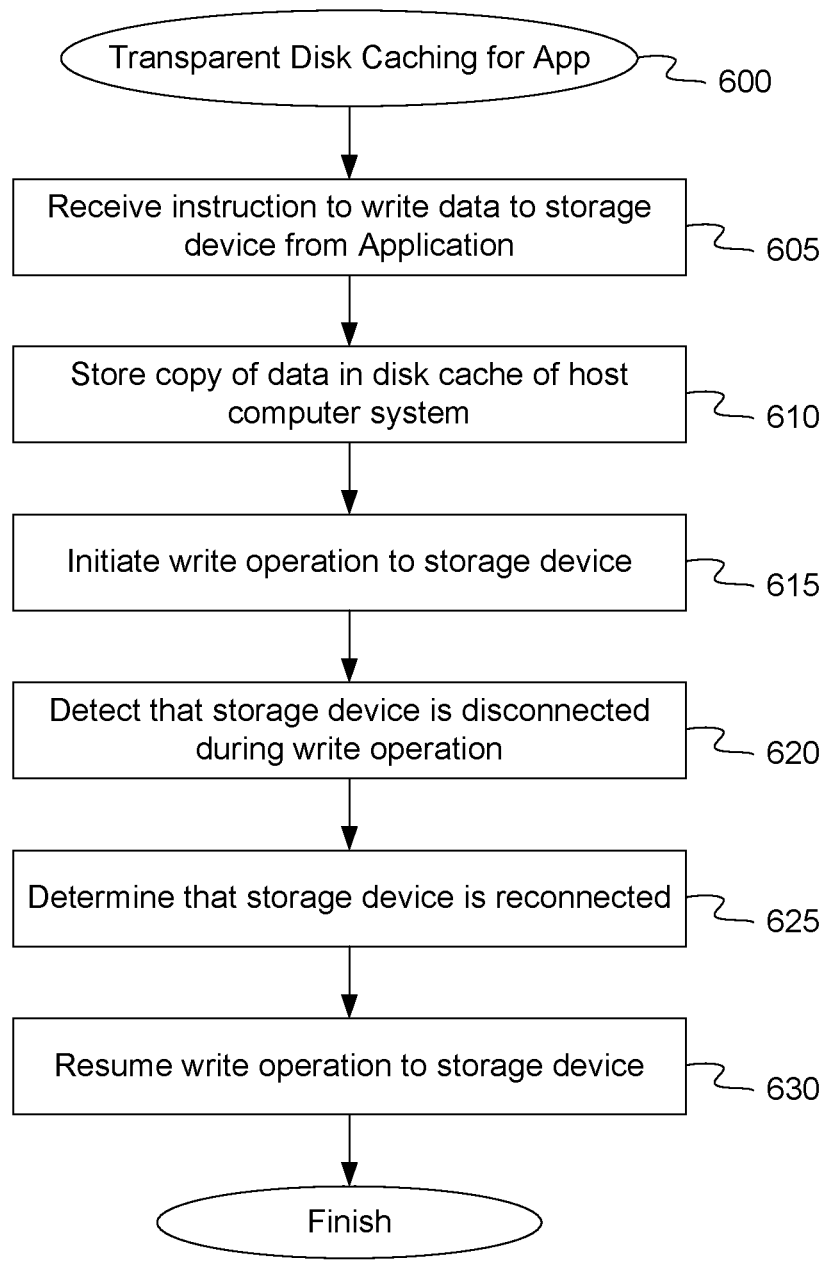
FIG. 6 is a flow diagram illustrating a transparent disk caching method for applications, according to an embodiment.

FIG. 6 is a flow diagram illustrating a transparent disk caching method for applications, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow a host computer system to cache data received from an application in a disk cache before the data is committed to disk, so that the data can be recovered in the event of an interruption during the write process. In one embodiment, method 600 may be performed by transparent disk caching manager 233, as shown in FIGS. 2 and 3.

Referring to FIG. 6, at block 605, method 600 receives an instruction to write data to a storage device coupled to the host computer system 210. In one embodiment, virtual machine/application interface 372 may receive an instruction to write data to a storage device (e.g., part of storage domains 252, 254) from one of applications 240, 242. The instruction may be received during the normal course of operation of applications 240, 242 and may relate to user data, system data, or other data being committed to the underlying physical storage devices in one of storage domains 252, 254.

At block 610, method 600 stores a copy of the data in a cache 234 of the host computer system 210. In one embodiment, cache manager 374 may store a copy of the data in cache 234 before the data is written to one of underlying storage domains 252, 254. Cache manager 374 can manage the cache 234 so that the data remains stored in cache 234 until the data has been committed to disk. The data is only cleared from cache 234 after a period of time, or when additional space is needed, thereby ensuring that the data is successfully committed to the disk before it is removed from the cache 234.

At block 615, method 600 writes the data from cache 234 to the storage device. In one embodiment, storage device interface 376 may initiate a write operation to write the data from the cache 234 to the storage device, in response to receiving the instruction at block 605. In one embodiment, the data is only written to disk after it is stored in cache 234 to ensure that the data is not lost in the event of an interruption during the write operation.

At block 620, method 600 detects that the storage device is disconnected from the host computer system during execution of the write operation. In one embodiment, storage domain 252 is directly connected to host computer system 210 over a USB interface 262 and storage domain 254 is connected to host computer system 210 over a network 264. During execution of the write operation, there may be a failure in writing the data to the storage device, such as if the USB interface 262 becomes disconnected, the network 264 goes down or if the storage device runs out of available space or becomes otherwise inaccessible. In one embodiment, storage device interface 376 may detect that the storage device is disconnected from host computer system 210 or is otherwise unavailable. In one embodiment, transparent disk caching manager 233 pauses the write operation in response to detecting that the storage device is disconnected from the host computer.

At block 625, method 600 determines that the storage device is reconnected to the host computer system 210. In one embodiment, storage device interface 376 may determine that the storage device is reconnected to host computer system 210. In one embodiment, the USB driver on host computer system 210 may detect that the USB cable has been plugged back in or that power has been restored to the USB connected storage device and may provide a notification of this event to storage device interface 376. In another embodiment, the network driver in host computer system 210 may monitor that status of the connection to network 264 and notify storage device interface 376 when the connection is restored.

At block 630, method 600 resumes the write operation to continue writing the data from cache 234 to the storage device. In one embodiment, cache manager 374 maintains an indication of the last piece of data that was successfully written to disk before the storage device was disconnected. In this case, cache manager 374 can resume writing with the next piece of data in sequence. In another embodiment, after an interruption to a write operation, cache manager 374 can compare the data committed to the storage device to what is stored in cache 234 to determine what data from cache 234 is still to be written to the storage device.

Figure 7:
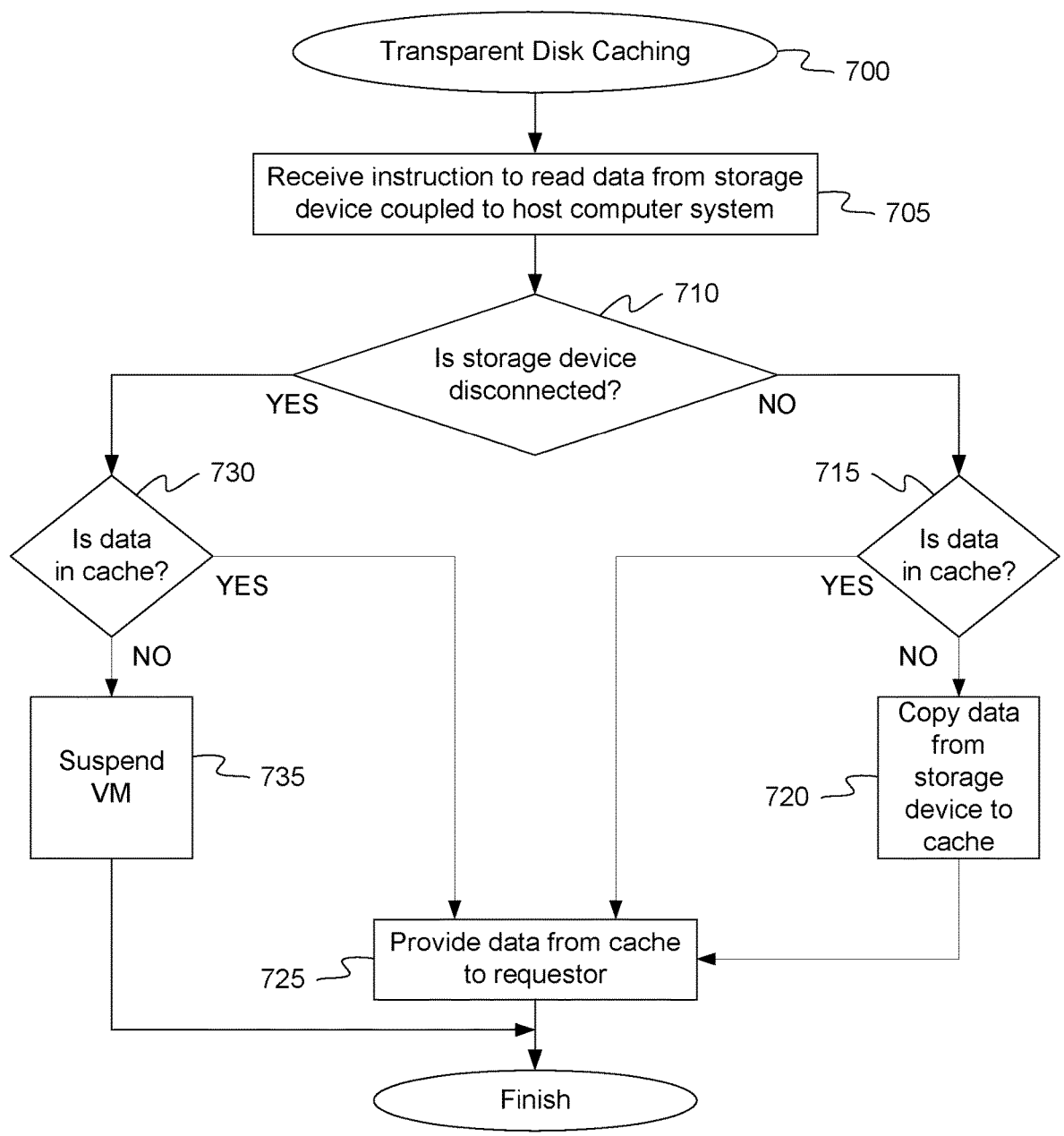
FIG. 7 is a flow diagram illustrating a transparent disk caching method for read requests, according to an embodiment.

FIG. 7 is a flow diagram illustrating a transparent disk caching method for read requests, according to an embodiment. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow a host computer system to cache data read disk, so that the data can be accessed in the event that the disk becomes disconnected and prevent the virtual machine or host application running on the host computer system being suspended unnecessarily. In one embodiment, method 700 may be performed by transparent disk caching manager 133, 233, as shown in FIGS. 1-3.

Referring to FIG. 7, at block 705, method 400 receives an instruction to read data from a storage device coupled to the host computer system 110, 210. In one embodiment, virtual machine/application interface 372 may receive an instruction to read data from a storage device (e.g., part of storage domains 152, 154, 252, 254) from one of virtual machines 140, 142 or applications 240, 242. The instruction may be received during the normal course of operation of virtual machines 140, 142 or applications 240, 242 and may relate to user data, system data, virtual machine image data, or other data previously committed to the underlying physical storage devices in one of storage domains 152, 154, 252, 254.

At block 710, method 700 determines whether the storage device is disconnected from the host computer system 110. In one embodiment, storage domain 152 is directly connected to host computer system 110 over a USB interface 162 and storage domain 154 is connected to host computer system 110 over a network 164. Prior to or during execution of the read operation, there may be a failure, such as if the USB interface 162 becomes disconnected, the network 164 goes down or if the storage device becomes otherwise inaccessible. In one embodiment, storage device interface 376 may detect that the storage device is disconnected from host computer system 110 or is otherwise unavailable. For example, a USB driver on host computer system 110 may detect that the USB cable has been unplugged or that power has been lost to the USB connected storage device and may provide a notification of this event to storage device interface 376. In another embodiment, a network driver in host computer system 110 may monitor that status of a network connection and notify storage device interface 376 when the connection to network 164 (and therefore to storage domain 154) is lost.

If the storage device is not disconnected (i.e. is still connected and fully accessible), at block 715, method 700 determines if the requested data is present in cache 134, 234. If the data is not found in cache 134, 234, at block 720, method 700 copies the requested data from the storage device to cache 134, 234. In one embodiment, storage device interface 376 may initiate a read operation to read the data from the storage device and copy the data to cache 134, 234 to the storage device. If the data was already present in cache 134, 234, or after the data is copied to cache 134, 234, at block 725, method 700 provides the requested data from cache 134, 234 to the requestor on host computer system 110.

If at block 710, method 700 determines that the storage device is disconnected, at block 730, method 700 determines if the requested data is present in cache 134, 234. If the data is present in cache 134, 234, at block 725, method 700 provides the requested data from cache 134, 234 to the requestor on host computer system 110. This enables virtual machine 140, 142 or host application 240, 242 to continue normal operation without being suspended or crashing due to a read operation error. If the data is not found in cache 134, 234, at block 735, method 700 suspends execution of virtual machines 140, 142. In another embodiment, method 500 may suspend execution of a process, running either on the virtual machine or on the host, which initiated the read operation.

In one embodiment, cache manager 133, 233 may implement read-ahead techniques to prefetch certain data from the storage device and have it available in cache 134, 234. For example, cache manager 133, 233 may recognize the virtual machine 140, 142 or host application 240, 242 which is currently accessing storage device (or even an individual process being executed on host computer system 110, 210. and, based on prior I/O statistics, identify certain pieces of data from the storage device that the process is likely to request. In one embodiment, cache manager 133, 233 or some other component of hypervisor 132 can monitor activities of these processes to build a profile comprising the I/O statistics. Upon identifying these pieces of data that are likely to be requested, cache manager 133, 233 can prefetch them from the storage device and make them available in cache 134, 234 before they are even requested. In this manner, even if the storage device becomes disconnected at some point, the processes can continue operation without having to be suspended or experiencing a read operation error. This can continue as long as the process requests data that has been stored in the cache, until the storage device can be reconnected.

Figure 8:
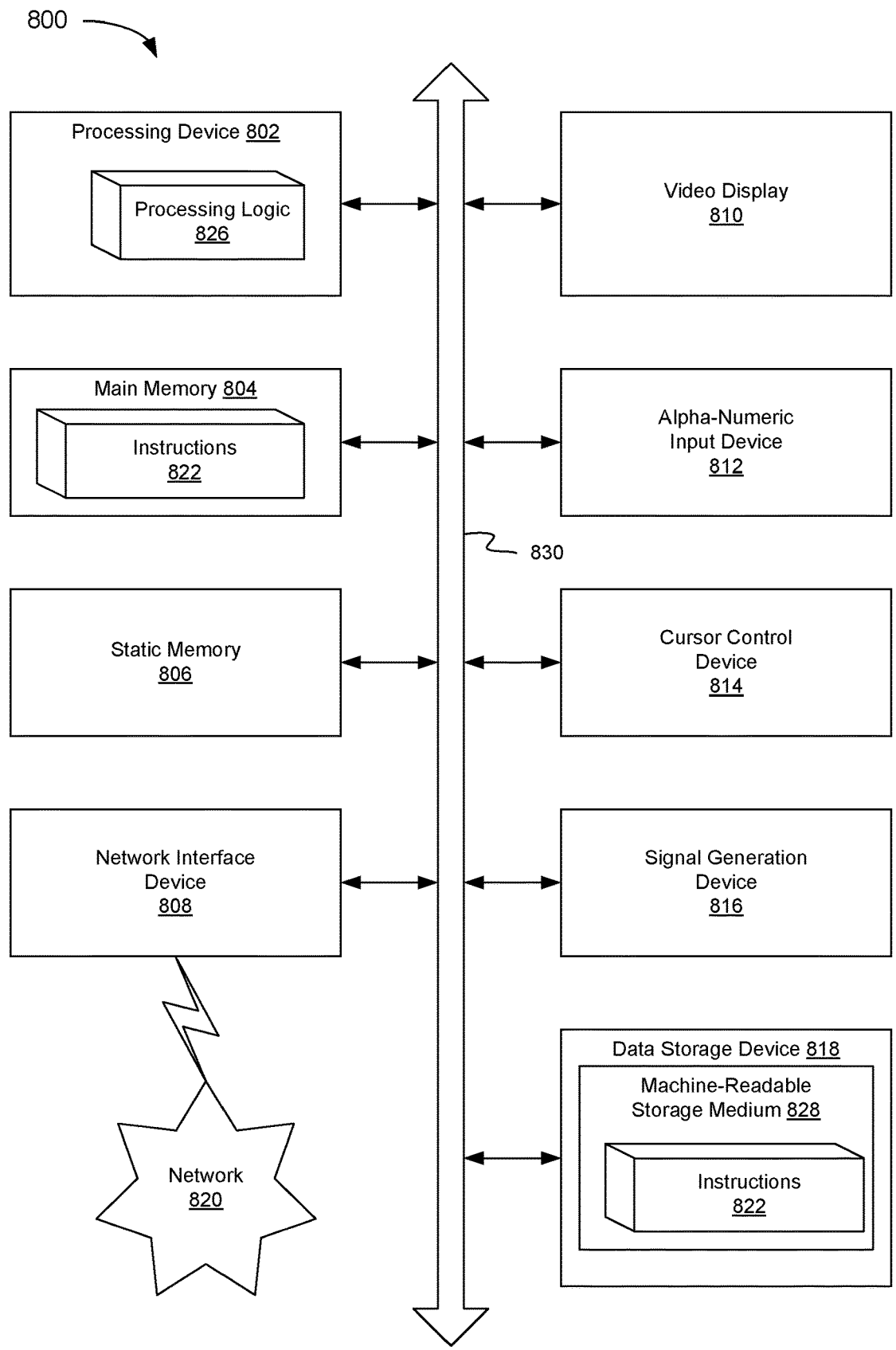
FIG. 8 is a block diagram illustrating an exemplary host computer system, according to an embodiment.

FIG. 8 illustrates a diagrammatic representation of a machine in the exemplary form of a host computer system 800 within which a set of instructions, for causing the machine to perform any one or more of the methodologies discussed herein, may be executed. For example, the instructions may cause the machine to perform transparent disk caching for virtual machines. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, host computer system 800 may represent either of host computer systems 110 and 210, as shown in FIGS. 1-2.

The exemplary host computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein. In one embodiment, processing logic 826 is representative of transparent disk caching manager 133 or 233.

The host computer system 800 may further include a network interface device 808. The host computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of transparent disk caching manager 133 or 233) embodying any one or more of the methodologies or functions described herein. The instructions 822 may also reside, completely or at least partially, within the main memory 804 and/or within processing logic 826 of the processing device 802 during execution thereof by the host computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device in a host computer system, a first instruction from an application executed on the host computer system to write first data from the application to an external storage device coupled to the host computer system, wherein the external storage device is coupled to the host computer system by at least one of a disconnectable hardware interface or a network connection;
   in response to the first instruction from the application, storing a copy of the first data in a cache of the host computer system before executing the first instruction to write the first data from the application to the external storage device, wherein the cache of the host computer system is implemented within the host computer system and is separated from the external storage device by the at least one of the disconnectable hardware interface or the network connection;
   after the copy of the first data is stored in the cache of the host computer system, initiating a first write operation to write the first data from the cache of the host computer system to the external storage device;

detecting that the external storage device is disconnected from the host computer system during execution of the write operation;

pausing the first write operation and suspending execution of a process that issued the first instruction in response to detecting that the external storage device is disconnected from the host computer system, wherein suspending execution of the process comprises saving a state of the process to a file in a memory of the host computer system;

determining that the external storage device is reconnected to the host computer system; and resuming the first write operation to continue writing the first data from the cache of the host computer system to the external storage device and resuming the execution of the process using the state of the process from the file in the memory in response to determining that the external storage device is reconnected to the host computer system.

2. The method of claim 1, further comprising:

receiving a second instruction to write second data to the external storage device while the external storage device is disconnected from the host computer system;

storing a copy of the second data in the cache of the host computer system; and refraining from initiating a second write operation to write the second data from the cache to the external storage device until the external storage device is reconnected to the host computer system.

3. The method of claim 1, wherein the cache comprises a circular buffer.

4. The method of claim 1, wherein the copy of the first data is to remain in the cache until at least one of a period of time elapses or a capacity of the cache is reached.

5. The method of claim 1, wherein the external storage device is coupled to the host computer system via a universal serial bus (USB) interface.

6. The method of claim 1, further comprising:

maintaining an indication of a last piece of the first data that was successfully written to the external storage device prior to the external storage device being disconnected from the host computer system.

7. The method of claim 1, further comprising:

comparing a first portion of the first data written to the external storage device prior to the external storage device being disconnected from the host computer system to the copy of the first data stored in the cache of the host computing system to identify a second portion of the first data not written to the external storage device, wherein resuming the first write operation comprises continuing writing the second portion of the first data from the cache of the host computer system to the external storage device.

8. A host computer system comprising:

a memory; and a processing device operatively coupled to the memory, the processing device to perform operations comprising:

receiving a first instruction from an application executed on the host computer system to write first data from the application to an external storage device coupled to the host computer system, wherein the external storage device is coupled to the host computer system by at least one of a disconnectable hardware interface or a network connection;

in response to the first instruction from the application, storing a copy of the first data in a cache of the host computer system before executing the first instruction to write the first data from the application to the external storage device, wherein the cache of the host computer system is implemented within the host computer system and is separated from the external storage device by the at least one of the disconnectable hardware interface or the network connection;

after the copy of the first data is stored in the cache of the host computer system, initiating a first write operation to write the first data from the cache of the host computer system to the external storage device;

detecting that the external storage device is disconnected from the host computer system during execution of the write operation;

pausing the first write operation and suspending execution of a process that issued the first instruction in response to detecting that the external storage device is disconnected from the host computer system, wherein suspending execution of the process comprises saving a state of the process to a file in a memory of the host computer system;

determining that the external storage device is reconnected to the host computer system; and resuming the first write operation to continue writing the first data from the cache of the host computer system to the external storage device and resuming the execution of the process using the state of the process from the file in the memory in response to determining that the external storage device is reconnected to the host computer system.

9. The host computer system of claim 8, the operations further comprising:

receiving a second instruction to write second data to the external storage device while the external storage device is disconnected from the host computer system;

storing a copy of the second data in the cache of the host computer system; and refraining from initiating a second write operation to write the second data from the cache to the external storage device until the external storage device is reconnected to the host computer system.

10. The host computer system of claim 8, wherein the cache comprises a circular buffer.

11. The host computer system of claim 8, wherein the copy of the first data is to remain in the cache until at least one of a period of time elapses or a capacity of the cache is reached.

12. The host computer system of claim 8, wherein the external storage device is coupled to the host computer system via a universal serial bus (USB) interface.

13. The host computer system of claim 8, the operations further comprising:

maintaining an indication of a last piece of the first data that was successfully written to the external storage device prior to the external storage device being disconnected from the host computer system.

14. The host computer system of claim 8, the operations further comprising:

comparing a first portion of the first data written to the external storage device prior to the external storage device being disconnected from the host computer system to the copy of the first data stored in the cache of the host computing system to identify a second portion of the first data not written to the external storage device, wherein resuming the first write operation comprises continuing writing the second portion of the first data from the cache of the host computer system to the external storage device.

15. A non-transitory computer readable storage medium storing instructions that, when executed by a processing device, cause the processing device to perform operations comprising:

receiving, by a host computer system, a first instruction from an application executed on the host computer system to write first data from the application to an external storage device coupled to the host computer system, wherein the external storage device is coupled to the host computer system by at least one of a disconnectable hardware interface or a network connection;

in response to the first instruction from the application, storing a copy of the first data in a cache of the host computer system before executing the first instruction to write the first data from the application to the external storage device, wherein the cache of the host computer system is implemented within the host computer system and is separated from the external storage device by the at least one of the disconnectable hardware interface or the network connection;

after the copy of the first data is stored in the cache of the host computer system, initiating a first write operation to write the first data from the cache of the host computer system to the external storage device;

detecting that the external storage device is disconnected from the host computer system during execution of the write operation;

pausing the first write operation and suspending execution of a process that issued the first instruction in response to detecting that the external storage device is disconnected from the host computer system, wherein suspending execution of the process comprises saving a state of the process to a file in a memory of the host computer system;

determining that the external storage device is reconnected to the host computer system; and resuming the first write operation to continue writing the first data from the cache of the host computer system to the external storage device and resuming the execution of the process using the state of the process from the file in the memory in response to determining that the external storage device is reconnected to the host computer system.

16. The non-transitory computer readable storage medium of claim 15, the operations further comprising:

receiving a second instruction to write second data to the external storage device while the external storage device is disconnected from the host computer system;

storing a copy of the second data in the cache of the host computer system; and refraining from initiating a second write operation to write the second data from the cache to the external storage device until the external storage device is reconnected to the host computer system.

17. The non-transitory computer readable storage medium of claim 15, wherein the cache comprises a circular buffer.

18. The non-transitory computer readable storage medium of claim 15, wherein the external storage device is coupled to the host computer system via a universal serial bus (USB) interface.

19. The non-transitory computer readable storage medium of claim 15, the operations further comprising:

maintaining an indication of a last piece of the first data that was successfully written to the external storage device prior to the external storage device being disconnected from the host computer system.

20. The non-transitory computer readable storage medium of claim 15, the operations further comprising:

comparing a first portion of the first data written to the external storage device prior to the external storage device being disconnected from the host computer system to the copy of the first data stored in the cache of the host computing system to identify a second portion of the first data not written to the external storage device, wherein resuming the first write operation comprises continuing writing the second portion of the first data from the cache of the host computer system to the external storage device.

* * * * *